United States Patent [19]

Kaufmann et al.

[11] Patent Number: 5,726,228
[45] Date of Patent: Mar. 10, 1998

[54] USE OF CARBONATES AS DEMOULDING AGENTS FOR THERMOPLASTIC POLYCARBONATES

[75] Inventors: Ralf Kaufmann, Duisburg; Wolfgang Ebert, Krefeld; Hartmut Löwer, Krefeld; Jürgen Kadelka, Krefeld; Claus Wulff, Krefeld; Gottfried Zaby, Leverkusen, all of Germany

[73] Assignee: Bayer Aktiengesellschaft, Leverkusen, Germany

[21] Appl. No.: 759,951

[22] Filed: Dec. 3, 1996

[30] Foreign Application Priority Data

Dec. 5, 1995 [DE] Germany ............. 195 45 330.1

[51] Int. Cl.⁶ .................... C08K 5/15; C08K 5/10
[52] U.S. Cl. .............. 524/108; 524/110; 524/111; 524/320; 524/322; 528/179
[58] Field of Search ................. 524/108, 112, 524/320, 322, 191; 528/179

[56] References Cited

U.S. PATENT DOCUMENTS

| | | | |
|---|---|---|---|
| 2,826,591 | 3/1958 | Riedeman | 549/229 |
| 3,186,961 | 6/1965 | Sears et al. | 524/111 |
| 3,883,466 | 5/1975 | Olstowski | 524/729 |
| 4,407,995 | 10/1983 | Dick | 524/108 |
| 4,408,000 | 10/1983 | Lee | 524/322 |
| 4,409,349 | 10/1983 | Ham | 524/108 |
| 4,579,896 | 4/1986 | Rosenquist | 524/108 |
| 5,244,954 | 9/1993 | Fasulo et al. | 524/322 |
| 5,246,999 | 9/1993 | Wielgosz et al. | 524/310 |
| 5,350,790 | 9/1994 | Urabe et al. | 524/320 |

FOREIGN PATENT DOCUMENTS

| | | |
|---|---|---|
| 213413 | 1/1990 | European Pat. Off. . |
| 350644 | 1/1990 | European Pat. Off. . |
| 417775 | 3/1991 | European Pat. Off. . |
| 420279 | 4/1991 | European Pat. Off. . |
| 511640 | 11/1992 | European Pat. Off. . |
| 2 064 095 | 7/1972 | Germany . |
| 455752 | 5/1974 | Germany . |
| 2507748 | 9/1976 | Germany . |
| 2 620 255 | 11/1977 | Germany . |
| 2701725 | 7/1978 | Germany . |
| 4117655 | 12/1992 | Germany . |
| 4227999 | 3/1994 | Germany . |
| 4 227 999 | 3/1994 | Germany . |
| 45-24439 | 10/1972 | Japan . |
| 47-98136 | 5/1974 | Japan . |
| 2-225558 | 9/1980 | Japan . |
| 60-81245 | 5/1985 | Japan . |
| 58-219629 | 6/1985 | Japan . |
| 2-12510 | 9/1991 | Japan . |
| 2-294979 | 6/1992 | Japan . |
| 47-45934 | 2/1994 | Japan . |
| 1057777 | 2/1967 | United Kingdom . |

*Primary Examiner*—Tae Yoon
*Attorney, Agent, or Firm*—Connolly and Hutz

[57] ABSTRACT

The present invention relates to the use of cyclic carbonates as demoulding agents for thermoplastic polycarbonates, and to the incorporation of these cyclic carbonates into the thermoplastic polycarbonates.

8 Claims, No Drawings

USE OF CARBONATES AS DEMOULDING AGENTS FOR THERMOPLASTIC POLYCARBONATES

The present invention relates to the use of cyclic carbonates of aliphatic polyalcohols, the remaining OH groups of which are completely or partially, preferably completely, esterified with aliphatic $C_1$–$C_{32}$ carboxylic acids or with benzoic acid, preferably with $C_4$–$C_{26}$ fatty acids, as demoulding agents for thermoplastic polycarbonates in amounts of 0.01% by weight to 10% by weight, preferably from 0.01% by weight to 3% by weight, with respect to 100% by weight of the sum of demoulding agents and thermoplastic polycarbonate.

Aliphatic polyalcohols are those which contain 3 to 8 C atoms and 3 to 6 OH groups, preferably 3 or 4 OH groups.

The addition of partial esters to polycarbonates is known from the following literature references, for example:

U.S. Pat. No. 3,186,961 describes the addition of partial esters as plasticisers to polycarbonates, in amounts of 5 to 200 parts per 100 parts of polycarbonate.

Sho-45-24 439 describes the addition of partial esters to polycarbonates in amounts of 0.05 to 5%, for demoulding purposes.

JP-72-45 934 describes polycarbonates which are treated to impart antistatic properties, containing 0.1 to 5% by weight of fatty acid monoglycerides.

Sho-47-98 136 describes the addition of glycerine esters of hydroxy fatty acids, as demoulding agents, to polycarbonates.

DE-OS 27 01 725 (Le A 17 784) describes the addition of partial esters of special alcohols to polycarbonates for demoulding purposes.

Sho-60-81 245 describes the addition of partial esters to polycarbonates low in chlorine, in order to prevent the corrosion of tools.

Sho-60-113201 describes mouldings for optical applications, comprising polycarbonates which contain fatty acid monoglycerides (see EP-0 417 775 also).

EP 0 213 413 describes the addition of partial esters to polycarbonates for optical purposes.

Hei-2-225 558 describes polycarbonate sheets which contain partial esters of polyols and aliphatic monocarboxylic acids.

Japanese Patent Application 90-12 510 of 24.1.1990 describes substrates for CDs, which consist of polycarbonate and which contain 0.002 to 5% of fatty acid monoglycerides.

Japanese Patent Application No. 90-294 979 of 31.10.1990 describes polycarbonates for optical discs, which contain 0.06 to 0.09% of glycerol monostearate.

EP 0 511 640 also describes the addition of partial esters to polycarbonates for optical purposes.

Finally, polycarbonates comprising fatty acid esters which contain OH groups are also known from DE-A-41 17 655 or from U.S. Pat. No. 5,246,999.

All these fatty acid esters which contain OH groups have the disadvantage that the additives which contain OH groups can result in transesterifications with the polycarbonate. Phenolic OH groups are thereby formed, which result in the material becoming thermally sensitive and sensitive to oxidation.

In this connection, it has also been shown that when fatty acid monoglycerides are incorporated in thermoplastic polycarbonates, according to JP-72-45 934 for instance, cyclic carbonates of the corresponding fatty acid monoglycerides are formed.

However, in our opinion this discovery does not anticipate the subject matter of the present invention; moreover it does not suggest it.

On the contrary, the direct addition of cyclic carbonates to thermoplastic polycarbonates has not hitherto been found in the literature.

It is also known that the demoulding behaviour of polycarbonates can be improved by the addition of fatty acid esters of completely esterified polyalcohols (see DE-OS 25 07 748 (Le A 16 284), for example). However, additions such as these have the disadvantage that they can lead to coatings on the mould due to the high proportion of aliphatic compounds.

It is also known from EP-0 420 279 that polycarbonates which have a content of fatty acid esters and which contain no, or only very few, OH groups, can be used for optical storage media (see page 3, lines 19 to 31 of EP-0 420 279 A2). Optical storage media of this type have the aforementioned disadvantages:

Transparent, free-flowing polycarbonate mixtures comprising aromatic polycarbonates and aliphatic polycarbonates are known from DE-OS 42 27 999 (Le A 29 135).

However, mixtures of this type generally contain catalysts, due to the synthesis route to aliphatic polycarbonates. On account of these transesterification catalysts, transesterification also occurs with the aromatic polycarbonate.

Thus all the additive systems which have been known hitherto have certain disadvantages as demoulding agents for polycarbonate moulding compositions, so that they are hardly suitable, or are not at all suitable, for further processing to form optical storage media, particularly for the production of compact discs.

The object was therefore to develop a demoulding agent for polycarbonates which has little tendency, or no tendency at all, to undergo transesterification under production and processing conditions, which has a good demoulding effect, and which thus results in improved pit replication and a greater degree of data integrity. This is achieved by the use according to the invention of cyclic carbonates.

Thermoplastic aromatic polycarbonates in the sense of the present invention comprise both homopolycarbonates and copolycarbonates; the polycarbonates may be linear or branched, in the known manner.

These polycarbonates are produced in the known manner from diphenols, carboxylic acid derivatives, and optionally from chain terminators and optionally from branching agents.

Details of the production of polycarbonates have been set down in many patent specifications for about 40 years. By way of example, reference is made here to Schnell, "Chemistry and Physics of Polycarbonates", Polymer Reviews, Volume 9, Interscience Publishers, New York, London, Sydney 1964; to D. Freitag, U. Grigo, P. R. Müller, H. Nouverne', BAYER AG, "Polycarbonates" in the Encyclopedia of Polymer Science and Engineering, Volume 11, Second Edition, 1988, pages 648–718; and finally to "Polycarbonate" by Drs. U. Grigo, K. Kirchner and P. R. Müller in Becker/Braun, Kunststoff-Handbuch [*Plastics Handbook*], Volume 3/1, Polycarbonates, Polyacetals, Polyesters, Cellulose Esters, Carl Hanser Verlag Munich, Vienna 1992, pages 117–299.

Examples of suitable diphenols for producing the polycarbonates include hydroquinone, resorcinol, dihydroxydiphenyls, bis-(hydroxyphenyl)-alkanes, bis-(hydroxyphenyl)-cycloalkanes, bis-(hydroxyphenyl)-sulphides, bis-(hydroxyphenyl)-ethers, bis-(hydroxyphenyl)-ketones, bis-(hydroxyphenyl)-sulphones, bis-(hydroxyphenyl)-sulphoxides and α,α'-bis-(hydroxyphenyl)-diisopropylbenzenes, as well as compounds thereof which comprise alkylated or halogenated nuclei.

Preferred diphenols comprise 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-p-diisopropylbenzene, 2,2-bis-(3-methyl-4-hydroxyphenyl)-propane, 2,2-bis-(3-chloro-4hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulphone, 2,4-bis-(3,5-dimethyl-4-hydroxyphenyl)-2-methylbutane, 1,1-bis-(3,5-dimethyl-4hydroxyphenyl)-p-diisopropylbenzene, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-3,3,5-trimethylcyclohexane.

Particularly preferred diphenols comprise 2,2-bis-(4-hydroxyphenyl)-propane, 2,2-bis(3,5-dimethyl-4-hydroxyphenyl)-propane, 2,2-bis-(3,5-dichloro-4-hydroxyphenyl)propane, 2,2-bis-(3,5-dibromo-4-hydroxyphenyl)-propane, 1,1 -bis-(4-hydroxyphenyl) cyclohexane and 1,1-bis-(4-hydroxyphenyl)-3,3,5-trimethylcyclohexane.

These and other diphenols are described, for example, in U.S. Pat. Nos. 3,028,635, 2,999,835, 3,148,172, 2,991,273, 3,271,367, 4,982,014 and 2,999,846, in German Offenlegungsschriften 1 570 703, 2 063 050, 2 036 052, 2 211 956 and 3 832 396, in French Patent Specification 1 561 518, in the monograph by H. Schnell, "Chemistry and Physics of Polycarbonates", Interscience Publishers, New York 1964, and in Japanese Patents laid open to public inspection 62039/1986, 62040/1986 and 105550/1986.

In the case of homopolycarbonates, only one diphenol is used; in the case of copolycarbonates, a plurality of diphenols is used.

Phosgene or diphenyl carbonate are examples of suitable carboxylic acid derivatives.

Suitable chain terminators comprise both monophenols and monocarboxylic acids. Suitable phenols include phenol itself, alkylphenols such as cresols, p-tert.-butylphenol, p-n-octylphenol, p-iso-octylphenol, p-n-nonylphenol and p-isononylphenol, halogenated phenols such as p-chlorophenol, 2,4-dichlorophenol, p-bromophenol and 2,4,6-tribromophenol, and mixtures thereof.

Suitable monocarboxylic acids comprise benzoic acid, alkylbenzoic acids and halogeno-benzoic acids.

The preferred chain terminators are phenols of formula (I)

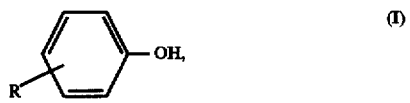

where

R H, tert. Butyl or is a branched or unbranched $C_8$- and/or $C_9$-alkyl radical.

The amount of chain terminator to be used is 0.1 mole % to 5 mole % with respect to the moles of diphenols used in each case. The chain terminators may be added before, during or after phosgenation.

Suitable branching agents include the trifunctional compounds or compounds with a functionality greater than three which are known in polycarbonate chemistry, particular those which contain three or more than three phenolic OH groups.

Examples of suitable branching agents include phloroglucinol, 4,6-dimethyl-2,4,6-tri-(4-hydroxyphenyl)-heptene-2,4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol, 2,6-bis-(2-hydroxy-5'-methyl-benzyl)-4-methylphenol, 2-(4-hydroxyphenyt)-2-(2,4-dihydroxyphenyl)-propane, hexa-(4-(4-hydroxyphenyl-isopropyl)-phenyl)-ortho-terephthalic acid ester, tetra-(4-hydroxyphenyl)-methane, tetra-(4-(4-hydroxyphenyl-isopropyl)-phenoxy)-methane and 1,4-bis-(4',4"-dihydroxytriphenyl)-methyl)-benzene, and also 2,4-dihydroxybenzoic acid, trimesic acid, cyanuric chloride and 3,3-bis-(3-methyl-4-hydroxyphenyl)-2-oxo-2,3-dihydroindole.

The amount of branching agents which are optionally used is 0.05 mole % to 2 mole %, again with respect to the moles of diphenols used in each case.

The branching agents may either be provided with the diphenols and the chain terminators in the aqueous alkaline phase, or may be added before phosgenation, dissolved in an organic solvent. In the case of the transesterification process, the branching agents are used together with the diphenols.

All these measures for producing thermoplastic polycarbonates are familiar to one skilled in the art.

Cyclic carbonates which can be used according to the invention are

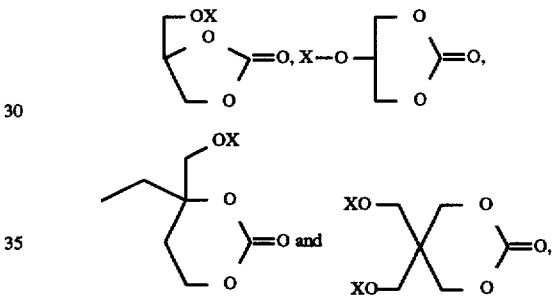

where

X is an aliphatic acyl radical containing 1 to 32 C atoms, preferably 1 to 26 C atoms, or is a benzyl radical.

Fatty acid esters containing 4 to 26 C atoms are particularly preferred as radical X.

Examples of X include benzoyl, acetyl, propionyl and butyryl, and also radicals of myristic acid, of palmitic acid or stearic acid, of arachic acid and of behenic acid.

As additives, one of these carbonates can be used or mixtures of two or more of them.

The carbonates to be used according to the invention are either known from the literature or are obtainable by methods known from the literature.

(See the Journal of Organic Chemistry, Vol. 35 (1970), pages 221 et seq).

Customary additives for polycarbonates can also be added in the known amounts to the thermoplastic polycarbonates to be demoulded according to the invention, for example stabilisers against heat, moisture and UV radiation, such as organic phosphites, optionally in combination with monomeric or polymeric epoxides, phosphate esters, N-containing heterocycles such as triazoles or benztriazoles, and also flame retardants such as aliphatic or aromatic or perfluorinated aliphatic alkali metal or alkaline earth metal sulphonates, as well as colorants and antistatic agents, provided that these additives do not limit the transparency of the polycarbonates to too great an extent.

The cyclic carbonates may be added to the thermoplastic polycarbonates, for example, by adding the cyclic carbonates during the processing of the polymer solution of the thermoplastic polycarbonates or by incorporating them in the melt of the thermoplastic polycarbonates; the addition is preferably effected by way of the compounding of the final thermoplastic polycarbonate.

Thus the present invention also relates to a method of incorporating cyclic carbonates of aliphatic polyalcohols, the remaining OH groups of which are completely or partially, preferably completely, esterified with aliphatic $C_1$–$C_{32}$ carboxylic acids or with benzoic acid, preferably with $C_4$–$C_{26}$ fatty acids, into thermoplastic polycarbonates, which is characterised in that the cyclic carbonates are added during the work-up of the polymer solution of the thermoplastic polycarbonates or are incorporated in the melt of the thermoplastic polycarbonates, in each case in amounts of 0.01% by weight to 10% by weight, preferably from 0.01% by weight to 3% by weight, with respect to 100% by weight of the sum of cyclic carbonate and thermoplastic polycarbonate.

The customary additives which are known for polycarbonate may be incorporated in the known manner in the polycarbonates, either before the addition of the cyclic carbonates, with the addition of the cyclic carbonates, or after the addition of the cyclic carbonates.

The polycarbonates which are readily demouldable according to the invention may be processed in the manner which is known for polycarbonates to form any desired mouldings.

This processing may be effected as a separate step from the production of the finished, readily demouldable polycarbonates, which may be produced as a granular material, for example. However, processing may also be effected immediately, in the course of incorporating the cyclic carbonates and/or the usual additives.

Examples of mouldings from the mixtures according to the invention include data storage devices, compact discs, etc.

In the case of data storage devices, the application of these mouldings in the field of optics has the advantages mentioned above at the outset, which could not be foreseen.

EXAMPLES

1. Production of the compounds.

The additives are incorporated by compounding. For this purpose the required quantity of additive is mixed with predried polycarbonate granules in a tumbler mixer and the mixture is then reextruded at 240° C. in a twin-screw extruder of type WP ZSK 32.

2. Production of the compact discs

The CD's required for carrying out the tests were produced in an injection-moulding machine made by Netstal having a clamping force of 90 l and containing a CD-producing device of type HCA made by ICT Axxicon. The melt temperature was 310° C., the temperature of the device was 65° C. and the cycle time was set at 4.7 secs.

3. Products obtained

The base material used was a polycarbonate which was produced using p-tert.-butylphenol as the chain terminator and which had a relative solution viscosity of 1.200.

3.1 Product A according to the invention: 0.1% of glycerol monostearate carbonate was incorporated by compounding, as described above.

3.2 Comparison Example B: 0.25% of pentaerythritol tetrastearate (the standard demoulding agent for polycarbonate) was incorporated by compounding, as described above.

3.3 Comparison Example C: The base material without any additives was used as Comparison Example C.

4. Tests:

The following tests were carried out on the granule mixtures and the CD's produced therefrom:

4.1 Melt stability on processing in the moist state:

For this purpose granules of the respective mixture were heated without predrying for 5 minutes in a rheometer and a melt strand was then formed by extrusion, as is customary for the measurement of melt viscosity. The relative solution viscosity of this melt strand was then determined. The value measured was the decrease in the relative solution viscosity before and after heating. The solution viscosity was measured in accordance with DIN 51562 T.3.

4.2 Pit replication/HF signal

An important criterion for compact discs is the quality of the surface structure of the pits carrying the information. A criterion for the quality of the pit replication is the so-called High Frequency Signal HF (I11). This signal was determined with the aid of the CD tester made by ISEDD of Bielefeld.

4.3 Flaw formation

A further qualitative criterion for compact discs is the occurrence of visible surface defects manifested in the form of dark spots, feather-like structures or lines. These defects are caused by deformations of the surface of the CD as it is demoulded from the injection-moulding machine and are thus a direct indication of the quality of the demoulding agent employed. The frequency with which flaws occur and the scale thereof is assessed visually and subdivided into 4 categories (1: none, 2: almost invisible, 3: readily visible, 4: extensive).

5. Results

The results are summarised in the following table:

| No. | Test | Unit | Example A | Example B | Example C |
|---|---|---|---|---|---|
| 4.1 | melt stability on processing in the moist state | $\delta$ $\eta_{rel.}$ | 0.001 | 0.025 | 0.001 |
| 4.2 | pit replication/ HF signal | % | 70 | 62 | 70 |
| 4.3 | flaw formation | category | 1–2 | 3 | 4 |

The production of glycerol monostearate carbonate 36 g (0.1 mol) of glycerol monostearate are dissolved in a mixture of 500 ml of dichloromethane, 200 ml of chlorobenzene and 28 g of pyridine (0.35 mol) at room temperature under a nitrogen blanket. Then 0.15 mol of phosgene are introduced and the mixture is stirred at room temperature in a stream of nitrogen until it is free of phosgene. Then it is acidified with 5% hydrochloric acid at 5° C. and the organic phase is separated off and washed with water until free of electrolytes. Then the organic phase is dried and concentrated in a water-jet vacuum.

A carbonate is obtained containing <1 ppm of hydrolysable chlorine and having a residual OH number of 6 ppm.

Yield: 34.3 g (88.8%)

After recrystallisation in an acetone/hexane mixture (1:5) the OH number fails to <2.

We claim:

1. Thermoplastic polycarbonate which contains, as demoulding agent, 0.01 to 10% by weight, based on weight of thermoplastic polycarbonate and demoulding agent, of cyclic carbonates of aliphatic polyalcohols in which the remaining OH groups are completely or partially esterified with aliphatic $C_1$–$C_{32}$ carboxylic acids or with benzoic acid.

2. The thermoplastic polycarbonate as claimed in claim 1, wherein the remaining OH groups of the cyclic carbonates of aliphatic polyalcohols are completely esterified.

3. The thermoplastic polycarbonate as claimed in claim 1, wherein the remaining OH groups of the cyclic carbonates of aliphatic polyalcohols are completely or partially esterified with $C_4$–$C_{26}$ fatty acids.

4. The thermoplastic polycarbonate according to claim 3, wherein the remaining OH groups of the cyclic carbonates of aliphatic polyalcohols are completley esterified.

5. The thermoplastic polycarbonate as claimed in claim 1, containing 0.01% to 3% by weight of demoulding agent.

6. A method of making thermoplastic polycarbonate, as claimed in claim 1, which comprises adding the cyclic carbonates during the work-up of the polymer solution of the thermoplastic polycarbonates, or incorporating the cyclic carbonates in the melt of the thermoplastic polycarbonates.

7. The method of claim 6, wherein the cyclic carbonates are added during the work-up of the polymer solution.

8. The method of claim 6, wherein the cyclic carbonates are incorporated in the melt of the thermoplastic polycarbonates.

* * * * *